(12) United States Patent
Gajjar et al.

(10) Patent No.: US 6,801,992 B2
(45) Date of Patent: Oct. 5, 2004

(54) SYSTEM AND METHOD FOR POLICY BASED STORAGE PROVISIONING AND MANAGEMENT

(75) Inventors: Kumar Gajjar, San Jose, CA (US); Jim Collins, Nashua, NH (US); Richard Meyer, San Francisco, CA (US); Chandra Prasad, Los Altos, CA (US); Dipam Patel, Fremont, CA (US)

(73) Assignee: Candera, Inc., Milpitas, CA (US)

( * ) Notice: Subject to any disclaimer, the term of this patent is extended or adjusted under 35 U.S.C. 154(b) by 252 days.

(21) Appl. No.: 10/077,482

(22) Filed: Feb. 13, 2002

(65) Prior Publication Data

US 2002/0174306 A1 Nov. 21, 2002

Related U.S. Application Data

(60) Provisional application No. 60/268,694, filed on Feb. 13, 2001.

(51) Int. Cl.[7] ............................................. G06F 12/00
(52) U.S. Cl. ...................... 711/173; 711/112; 711/153; 709/215; 718/104
(58) Field of Search ........................... 711/112, 114, 711/4, 111, 147, 153, 170, 173; 709/215, 1, 214; 718/104

(56) References Cited

U.S. PATENT DOCUMENTS 4,916,608 A * 4/1990 Shultz ........................ 718/104
5,325,505 A   6/1994 Hoffecker et al. .......... 707/101
5,897,661 A * 4/1999 Baranovsky et al. ........ 711/170
6,202,157 B1  3/2001 Brownlie et al. ........... 713/201

FOREIGN PATENT DOCUMENTS

WO    WO 02/05185 A1    1/2002

OTHER PUBLICATIONS

Al–Mouhamed et al., "A Heuristic Storage for Minimizing Access Time of Arbitrary Data Patterns", © 1997 IEEE, p. 441–447.*

R. Montague et al., *"Virtualizing The San"* Morgan Keegan Equity Research, pp. 20, Morgan Keegan & Company, Inc. Memphis TN, (Jul. 5, 2000).

* cited by examiner

*Primary Examiner*—Nasser Moazzami
*Assistant Examiner*—Brian R. Peugh
(74) *Attorney, Agent, or Firm*—Brian N. Young; Townsend and Townsend and Crew, LLP (57) ABSTRACT

A storage provisioning policy is created by specifying storage heuristics for storage attributes using storage heuristic metadata. Storage attributes characterize a storage device and storage heuristic metadata describe how to specify a storage heuristic. Using the storage heuristic metadata, storage heuristics are defined to express a rule or constraint as a function of a storage attribute. In addition, the storage provisioning policy may also specify mapping rules for exporting the storage to a consumer of the storage, such as the server or server cluster.

44 Claims, 6 Drawing Sheets

SYSTEM AND METHOD FOR POLICY BASED STORAGE PROVISIONING AND MANAGEMENT

CROSS-REFERENCES TO RELATED APPLICATIONS

This application claims priority to U.S. Provisional Application No. 60/268,694, filed Feb. 13, 2001, entitled "Virtual Storage Systems" which is incorporated herein by reference.

BACKGROUND OF THE INVENTION

The present invention generally relates to computer storage and more specifically, to a system and method for policy-based storage provisioning.

As applications become more advanced and complicated, the allocation of storage for the applications becomes increasingly difficult. Storage area networks (SANs), for example, provide applications running on computer systems (servers, server clusters, PCs, and so on) with high storage capacity capability using a plurality of storage server systems coupled to the computer systems. Typically, SAN administrators manually allocate storage based upon the needs of an application running on a server or server cluster that will use disk space. Additionally, when there are any changes, such as in the characteristics of the application, the characteristics of the server or server cluster, the capability of the storage devices, the network topology, or the availability of storage in a data center, the administrator may need to revise earlier decisions on storage allocations and take necessary corrective action, such as migrating existing data from existing disks to new disks. The changing of earlier decisions of storage allocation may be complex, time-consuming, and error-prone, and may require application downtime.

Frequently, storage administrators do not have the necessary information and/or tools to process available information to take the appropriate actions. Further, even if the necessary information and tools are available to take the corrective actions, the effort and cost involved may deter the administrators from taking the actions. Thus, sub-optimal usage of storage capacity results and the performance of an application is subsequently degraded.

Another issue that SAN administrators face is the heterogeneity of storage configuration interfaces for each of the different types of storage devices that are deployed in a SAN. Each of the storage configuration interfaces have different capabilities and nuances that make it very difficult, if not impossible, for SAN administrators to configure storage in a consistent and uniform manner. Thus, deploying new storage devices becomes very difficult and may even be delayed or avoided even though the new storage device may be more suitable or cost effective for the applications that use the storage.

BRIEF SUMMARY OF THE INVENTION

In one embodiment, an apparatus and method for provisioning and managing storage using storage provisioning policies is provided. Storage provisioning policies are created and are used to select and provision appropriate storage for applications.

A storage provisioning policy is created by specifying storage heuristics for storage attributes using storage heuristic metadata. Storage attributes characterize a storage device and storage heuristic metadata describe how to specify a storage heuristic. Using the storage heuristic metadata, storage heuristics are defined to express a rule or constraint as a function of a storage attribute. In addition, the storage provisioning policy may also specify mapping rules for exporting the storage to a consumer of the storage, such as the server or server cluster.

After storage provisioning policies are created, discovered data for storage attributes associated with the storage devices are compared to related storage heuristics for the storage attributes found in the storage profile. Then, one or more storage devices are selected for provisioning if the discovered attributes of the storage devices satisfy the storage heuristics in the storage profile. The storage that is provisioned may be any type of storage, such as storage units of storage devices, storage devices, and the like. In another embodiment, virtual media units may be created if no storage devices satisfy the storage heuristics in the storage profile. The selected or created storage units are then provisioned to the storage consumer using the mapping rules specified as part of the storage provisioning policy.

In one embodiment, a method for provisioning one or more storage devices using one or more storage provisioning policies and discovered storage attribute data from the one or more storage devices is provided. The one or more storage provisioning policies comprising one or more storage heuristics for one or more storage attributes. The method comprises: comparing the discovered storage attribute data associated with the one or more storage devices to the one or more storage heuristics for the storage attributes in the one or more storage provisioning policies; and if discovered storage attribute data associated with a storage device in the one or more storage devices satisfy the one or more storage heuristics for the one or more storage attributes, provisioning the storage device.

In another embodiment, a method for creating one or more storage provisioning policies is provided. The method comprises: defining one or more storage attributes; defining one or more storage heuristic metadata associated with the one or more storage attributes; and specifying one or more storage heuristics using the defined one or more storage heuristic metadata associated with the one or more defined storage attributes to create the storage provisioning policy, the storage provisioning policy usable to provision a storage device, wherein the provisioned storage device includes discoverable data that satisfies the storage heuristics for the storage attributes.

A further understanding of the nature and advantages of the invention herein may be realized by reference of the remaining portions in the specifications and the attached drawings.

DETAILED DESCRIPTION OF THE INVENTION

The present application is related to other applications, filed on this date, Feb. 13, 2001, and assigned to the present assignee, that are directed to other aspects of storage servers and that claim priority to U.S. Provisional Application No. 60/268,694 above: U.S. Nonprovisional patent application No. 10/077,696, entitled "Silicon Based Storage Virtualization Server"; U.S. Nonprovisional patent application No. 10/076,855, entitled "Storage Virtualization and Storage Management to Provide Higher Level Storage Services"; U.S. Nonprovisional patent application No. 10/076,909, entitled "Method and Apparatus for Identifying Storage Devices"; U.S. Nonprovisional patent application No. 10/077,181, entitled "Virtual Data Center"; U.S. Nonprovisional patent application No. 10/076,906, entitled "Failover Processing in a Storage System"; U.S. Nonprovisional patent application No. 10/077,199, entitled "RAID at Wire Speed" and U.S. Nonprovisional patent application No. 10/076,878, entitled "Multi-Level Hardware Based Device Security". These applications are incorporated herein by reference for all purposes.

In one embodiment of the present invention, storage provisioning policies are created. The policies may be based on factors, such as Quality of Storage Service (QoSS) or the application requirements. Once a policy is created, the policy may be used to automatically provision storage, monitor storage, and take corrective actions. The policies may be used across a wide variety of storage devices allowing uniform deployment of storage provisioning policies in a heterogeneous storage environment.

Figure 1:
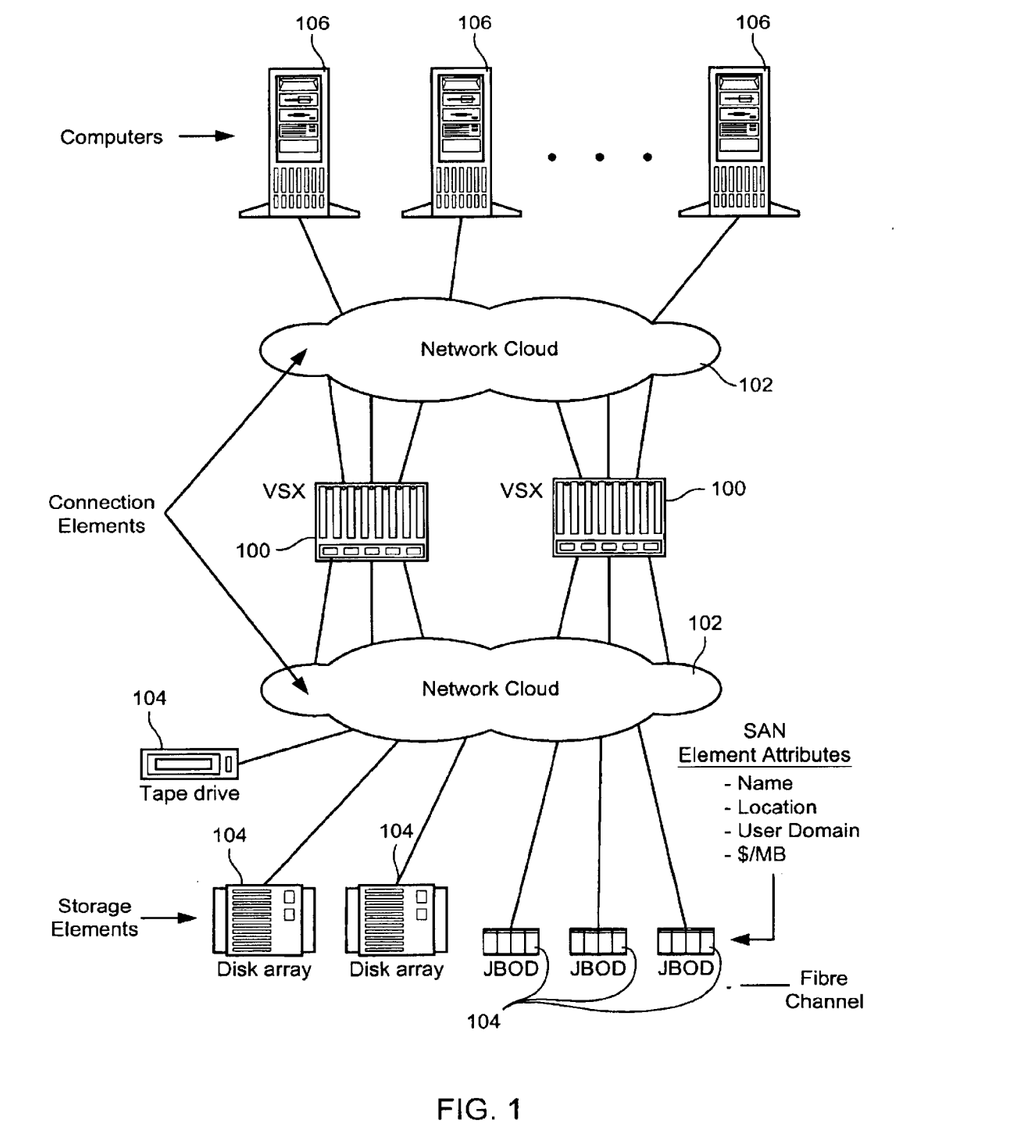
FIG. 1 shows a storage server according to an embodiment of the present invention.

FIG. 1 shows a storage server 100 according to an embodiment of the present invention. The figure also shows a storage area network (SAN) 102, a number of physical storage devices 104, and a number of host computers 106. The storage server 100 is also referred to as a Virtual Storage Exchange (VSX).

The SAN 102 can be any type of computer network. It is referred to as a storage area network in the present application because that is its relevant function with respect to the embodiments of the present invention. In an embodiment of the present invention, the SAN 102 is a Fibre Channel network, the host computers 106 and the storage devices 102 are configured to communicate with a Fibre Channel network, and the storage server 100 is also configured to communicate with a Fibre Channel network. Thus, the storage server 100 can be easily added to an existing SAN.

The physical storage devices 104 include tape drives, disk arrays, JBODs ("just a bunch of disks"), or other types of data storage devices. The physical storage devices 104 can be connected directly to the host computers 106 via the SAN 102 or can be indirectly connected to the host computers 106 via the SAN 102 and the storage server 100. Management of storage virtualization is improved by using the storage server 100 to indirectly connect the storage devices 104 to the host computers 106.

The host computers 106 can be servers or stand-alone computers. The host computers 106 can be directly connected to the SAN 102 or indirectly connected via a switch, router, or other communication link.

Figure 2:
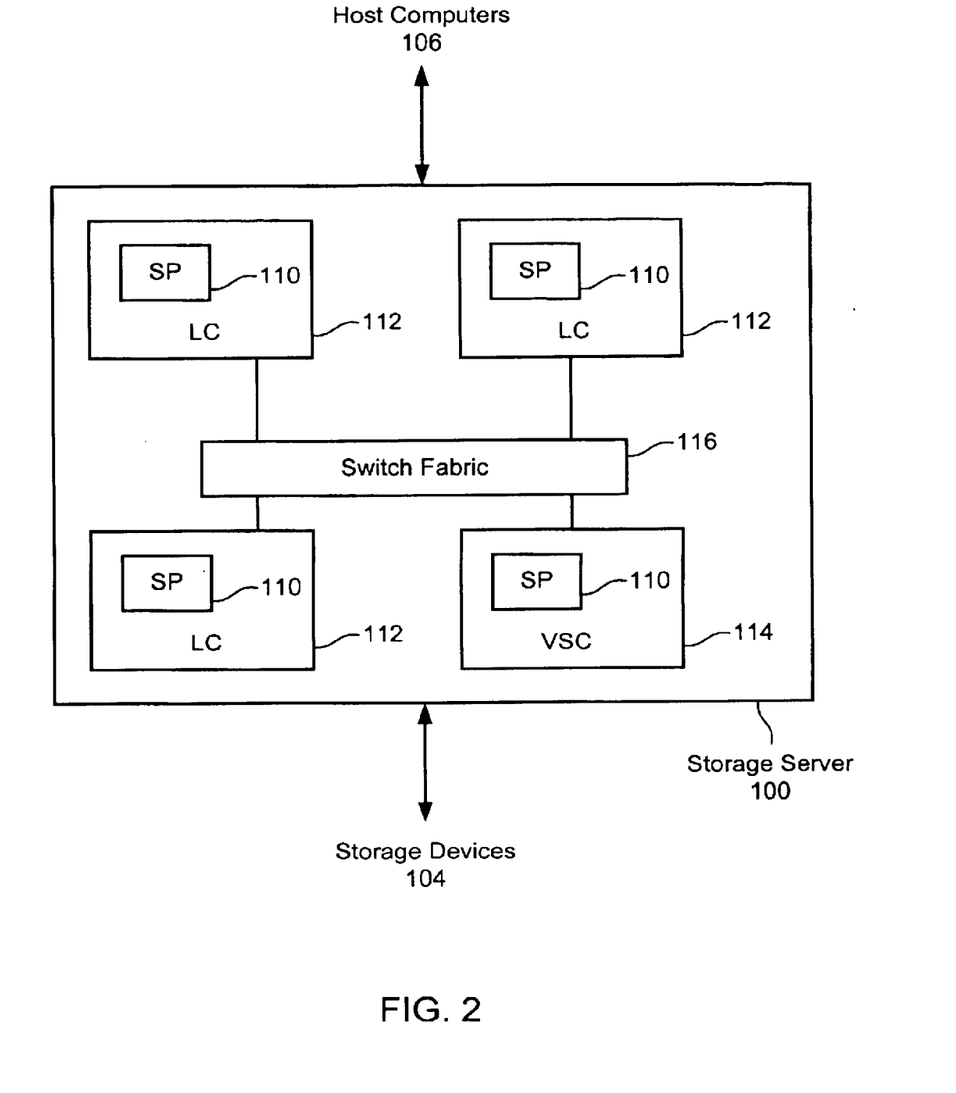
FIG. 2 is a block diagram of the storage server showing the hardware components related to embodiments of the present invention.

FIG. 2 is a block diagram of the storage server 100 showing the hardware components related to embodiments of the present invention, including a storage processor 110, a line card 112, a virtual server card 114, and a switch fabric 116.

The storage server 100 may include one or more storage processors 110. The storage processors 110 process the storage commands and data to be stored as information flows between the host computers 106 and the storage devices 104. One or more of the storage processors 110 may be included on each line card 112. The storage server 100 includes space for numerous line cards 112, so the capabilities of the storage server 100 can be modularly increased by adding more line cards 112 or more storage processors 110. Each storage processor 110 is associated with one or more ports of the storage server 100.

The storage server 100 may include one or more virtual server cards 114. The virtual server cards control the operation of the storage server 100 and control the line cards 112, which perform the actual work of transferring commands and data.

The switch fabric 116 connects the storage processors 110. The switch fabric switches information received at one port to another port of the storage server 100. For example, when a host computer 106 wants to read data stored on the storage area network 102, its request is processed by the storage processor 110 associated with the port associated with that host computer 106. That storage processor 110 is referred to as the upstream storage processor 110. The upstream storage processor 110 communicates with a downstream storage processor 110 associated with the port associated with the storage device 104 storing the data to be read, via the switch fabric 116. Then the switch fabric 116 transfers the data read from the storage device to the host computer 106, via the downstream and upstream storage processors 110.

VSX 100 allocates storage to host computers 106 based upon the needs of applications running on host computers 106. The process of configuring and exporting storage to host computers 106 is called storage provisioning. The storage provisioned may be any type of storage, such as storage units of storage devices, storage devices, and the like. The term storage device will be used hereinafter, and it will be understood that storage devices may represent any type of storage that may be provisioned.

In one embodiment, VSX 100 facilitates the process of storage provisioning by allowing a user to specify policies based upon different criteria such as, for example, the data access pattern of the application, availability of storage in the SAN, the reliability and data availability requirements for the data to be stored, etc. Additionally, once a Storage Provisioning policy has been established by the user, other users may use it to provision storage to servers. It will be understood that a user may be an administrator, application, software agent working on behalf of the application, and the like. VSX 100 facilitates the discovery of supported Storage Attributes, and the storage heuristics and storage heuristic metadata needed to create storage-provisioning policies based upon the supported attributes. This allows users to dynamically create and adapt the policies based upon the supported attributes.

In one embodiment, storage provisioning policies are created using storage attributes, storage heuristics, and storage heuristic metadata. Also, other actions, such as the mapping rules and corrective actions, may be specified in a storage provisioning policy. In creating a storage provisioning policy, an application's storage requirements are defined. Storage heuristics embodying the requirements are specified for storage attributes and stored in a storage profile. The specification of storage heuristics for storage attributes in the storage profile creates a storage provisioning policy that is used to allocate storage to a server.

Storage mapping rules may be specified and stored in the storage profile. However, in one embodiment, the storage mapping rules are stored in a storage mapping profile. It will be understood that the elements of the storage profile and storage mapping profile may be stored anywhere that is accessible to VSX 100. The mapping rules are used during the provisioning of storage to the storage consumer, such as the server or server cluster running the application for which the storage is required. Also, the storage mapping profile is used to handle changes to the storage consumer. For example, if a new server is added to a server cluster, for which storage has been provisioned, the storage mapping profile is used to automatically export the provisioned storage to the new server.

Multiple storage profiles may be created for different needs. For example, a storage profile may be created for allocating storage for databases and another for allocating storage for streaming applications. Also, policies may specify actions for the different needs, such as provisioning a certain minimum amount of available storage capacity in the SAN that satisfy a profile or provisioning a certain minimum amount of available storage capacity in the SAN that satisfy a profile that is available for immediate use.

A storage attribute is a property of storage that is used to characterize the storage. For example, an attribute may characterize a storage's performance, reliability, availability, cost, etc. The storage attributes of storage devices need to be discovered by software in VSX 100 in order to characterize the storage device. For example, storage attributes are discovered by systems and methods described in Attorney Docket No. 20949P-000500US entitled, "Method and Apparatus for Identifying Storage Devices,". In addition, as described hereinafter, VSX 100 may modify or create storage attributes to change the storage characteristic in order to provision storage. For example, changing the SCSI Mode Pages or creating a mirror set using several disks the characteristic of the storage may be changed.

Table 1 illustrates examples of storage attributes, corresponding descriptions of the storage attributes, and units in which the storage attributes may be measured according to one embodiment. Also, it will be understood that this list is not exhaustive and that a person skilled in the art will appreciate other storage attributes.

TABLE 1

| Attribute | Description | Unit |
| --- | --- | --- |
| Maximum transfer rate | The maximum amount of data that can be transferred per unit time | MB/second |
| Access Time | The per request latency for the last byte to be received that can be tolerated by the application. In initial versions, this may be approximated to the average disk access time. | Milliseconds |
| Storage Reliability (External RAID level) | The RAID-level of the external device. At a minimum, the attribute needs to identify RAID and non-RAID, but it is desirable to identify the RAID-level (RAID-1, RAID-5, etc.), if the storage is a RAID. | |
| Connectivity-Reliability | Whether there are single or multiple paths from the host to the storage. | |
| Storage Redundancy | Number of members that can fail without affecting the data integrity (For non-RAID storage this has to be one) | Members |

TABLE 1-continued

| Attribute | Description | Unit |
| --- | --- | --- |
| Long-term transfer rate | The amount of data that can be transferred over the lifetime of the application | MB/second |
| Last-byte latency | The per request latency for the last byte to be received that can be tolerated by the application | milliseconds |
| Availability | The fraction of time that the storage system is servicing requests that is needed by the application | Probability |
| Reliability | The probability need by the application that the storage system will be servicing requests continuously from time 0 to time t | Probability as a function of time |
| Correctness violation | The fraction of data that the application can tolerate dropped or incorrectly transferred | Probability |

A set of possible storage attributes are defined and stored in VSX 100. In another embodiment, the defined set may be stored remotely but be accessible to VSX 100.

Figure 3:
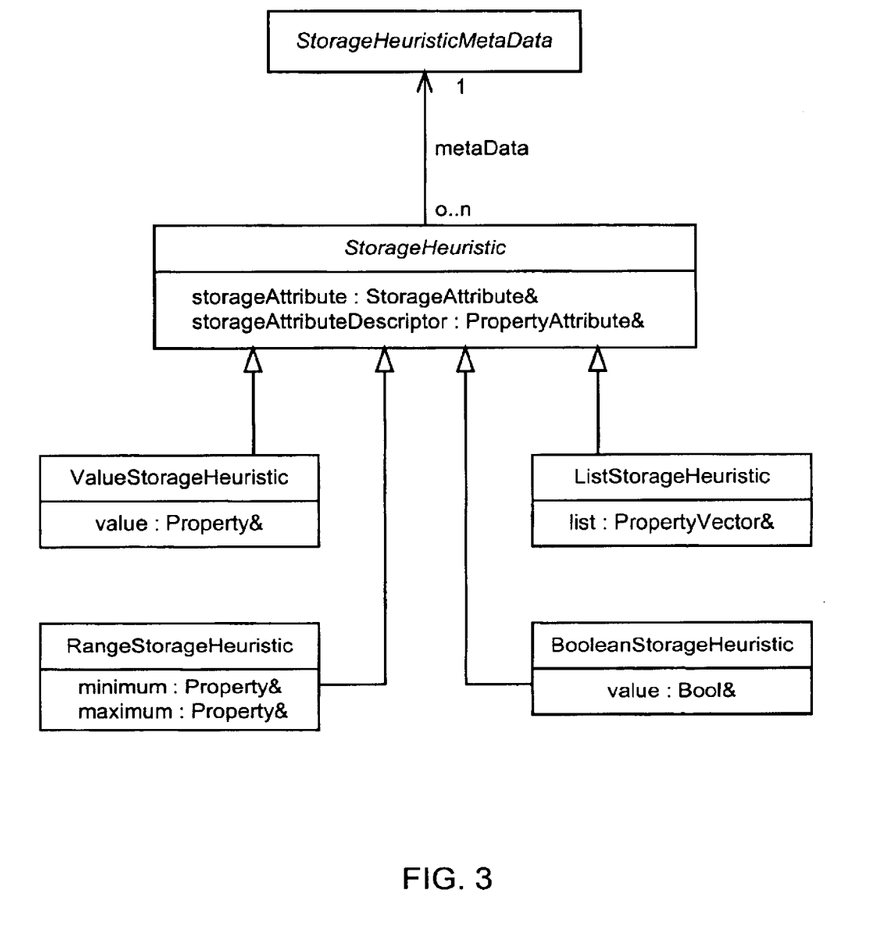
FIG. 3 illustrates a unified modeling language (UML) specification for a storage heuristic metadata according to one embodiment.

FIG. 3 illustrates a unified modeling language (UML) specification for a storage heuristic metadata according to one embodiment. A detailed description of UML is published by Object Management Group and is known in the art. Storage heuristic metadata provides a description of how to specify a storage heuristic. The description may describe whether a heuristic is specified as a value, range, list, or Boolean in addition to specifying a valid domain for the heuristic. Additionally, the description may describe more complex relationships, such as describing constraints or dependencies between storage heuristics. For example, a constraint for specifying heuristics on both the Vendor of a storage device and Model of a storage device in a storage profile would be that the Model specified should be one made by any one of the Vendors specified in the storage profile. If this constraint is not satisfied, then the heuristic cannot be satisfied. An example of a dependency—if the user specified RAID1 as a heuristic on the storage reliability attribute, then the user must also specify the number of members.

In one embodiment, the valid domain may be a range, list, or a list that is localized to the users language based on the local settings. A localized list is a list that has different discrete values. Each of these values has a different description in different languages. An example of a localized list is Multi-portedness—this list has two values single-ported and multi-ported in English and will have a different set of two values in French, Spanish, Japanese, Korean, etc.

Additionally, storage heuristic metadata specifies the data type and the unit used to mathematically express the storage heuristic for the storage attribute. Additionally, a constraint type may be defined, such as value, range, list, Boolean, etc. One example of storage heuristic metadata is specifying a range of 0 to 10,000 MB/second for the storage attribute maximum transfer rate and a constraint of Boolean. Thus, the metadata specifies that discovered data from storage devices for the attribute may be in the range of 0 to 10,000 MB/second and a constraint for the heuristic is a Boolean.

Storage heuristic metadata provides the building block for defining storage heuristics. In one embodiment, a user may discover all defined storage attributes by querying VSX 100 for storage attribute metadata. Once receiving the metadata for all attributes, the user specifies heuristics for desired storage attributes using the metadata.

Figure 4:
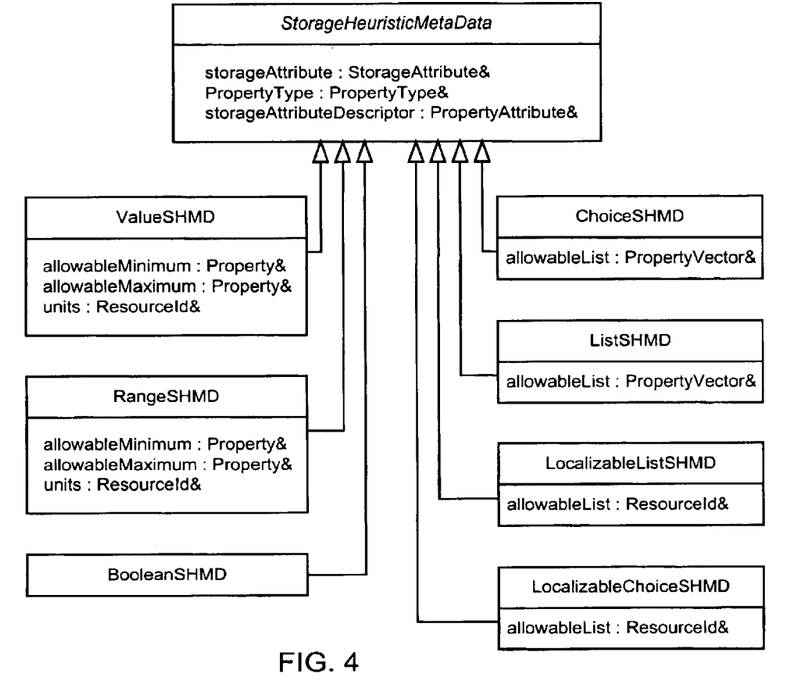
FIG. 4 illustrates a unified modeling language (UML) specification for a storage heuristic according to one embodiment.

FIG. 4 illustrates a unified modeling language (UML) specification for a storage heuristic according to one embodiment. A storage heuristic is a rule or constraint for an associated storage attribute. The rule may be expressed as a mathematical function of the storage attribute. The constraint or rule may be of several types, such as a value, range, list, Boolean, etc and is expressed as a data type, which is dependent on the particular storage attribute on which the constraint is being placed. The storage heuristic specifies the rule in a data type, such as integers, floating point variables, etc. Thus, for example, the value function indicates the constraint is expressed as a value of a certain data type, the range function indicates that the constraint is expressed as a range of a certain data type, the list function indicates the constraint is expressed as a list of a certain data type, and the Boolean function indicates that the constraint is expressed as a Boolean of a data type.

The storage heuristic is specified from the defined storage heuristic metadata. For example, a storage heuristic metadata for the storage attribute maximum transfer rate has the domain range of 0 to 10,000 MB/second and a constraint of a range. A storage heuristic is specified from the domain. For example, a storage heuristic might be a range for the transfer rate of 200 to 3000. Thus, the rule is access speeds between 200 MB/second and 3000 MB/second.

Figure 5:
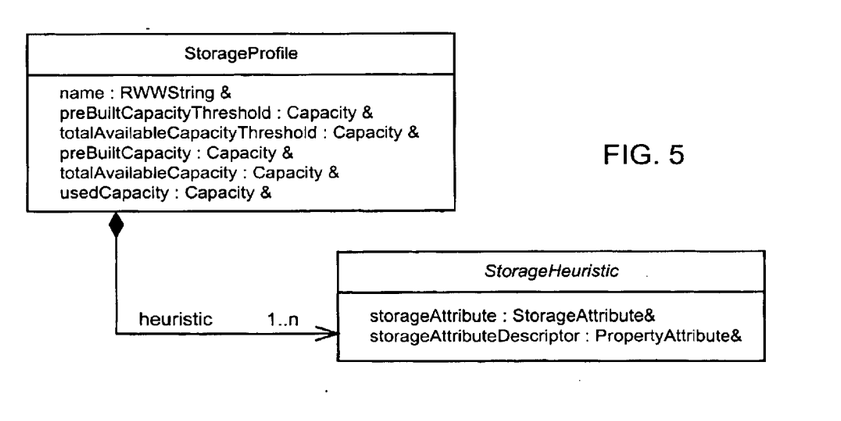
FIG. 5 illustrates a unified modeling language (UML) specification for a storage profile according to one embodiment.

FIG. 5 illustrates a unified modeling language (UML) specification for a storage profile according to one embodiment. The storage profile is a collection of storage heuristics that specify a storage provisioning policy. By including specific storage heuristics in a storage profile, only storage devices meeting those heuristics are provisioned. Also, the profiles may be used to implement policies using the profile, such as specifying the minimum amount of available storage capacity in the SAN that satisfies the profile or specifying the minimum amount of available storage capacity in the SAN available for immediate use that satisfies the profile.

The storage mapping rules may also be specified for the storage provisioning policy. The mapping rules specify rules for exporting the storage to a consumer of the storage, such as the server or server cluster. The mapping rules include policies on LUN (SCSI Logical Unit Number), the access rights to the data on the storage, etc.

Table 2 illustrates examples of storage mapping rules. Also, it will be understood that this list is not exhaustive and that a person skilled in the art will appreciate other storage mapping rules.

TABLE 2

| Storage Mapping Rule | Description | Type |
| --- | --- | --- |
| Same Access | When TRUE, each port in the consumer gets granted the same access rights to the storage unit. When FALSE, each port in the consumer gets granted different access rights to the storage unit. Some examples include a single writer/multiple reader storage consumer. | Boolean |
| Same LUN Number | The Logical Unit Number is the same for all ports, when possible. Otherwise the Logical Unit Number is assigned using the next possible number algorithm. | Boolean |
| Same Changes | Any modifications to the storage, such as Logical Unit Number, will be propagated to all of the network ports of the storage consumer. | Boolean |

Policies may also be specified for taking actions if certain conditions occur. For example, a policy for handling changes to a storage profile may specify an action to automatically migrate existing storage allocated to storage consumers using the storage profile to new storage that satisfies the new storage profile requirements. Thus, VSX 100 monitors the storage profile and when changes to the profile are detected, VSX 100 automatically migrates existing storage to new storage that meets the changed profile. This action is specified in the storage profile.

Also, corrective actions may be included in a policy. For example, VSX 100 monitors the storage heuristics specified in the storage profile used to allocate storage to a server. If any of the constraints of the storage heuristics are violated or changed, VSX 100 takes a corrective action that is specified in the storage profile. Examples of actions include but are not limited to alerting the SAN administrator, automatically migrating existing storage to storage that meets the QoSS requirements, etc. Additionally, changes to the storage consumer (the server or server cluster for which the storage has been provisioned) are handled by using the mapping rules specified in the storage mapping profile.

Figure 6:
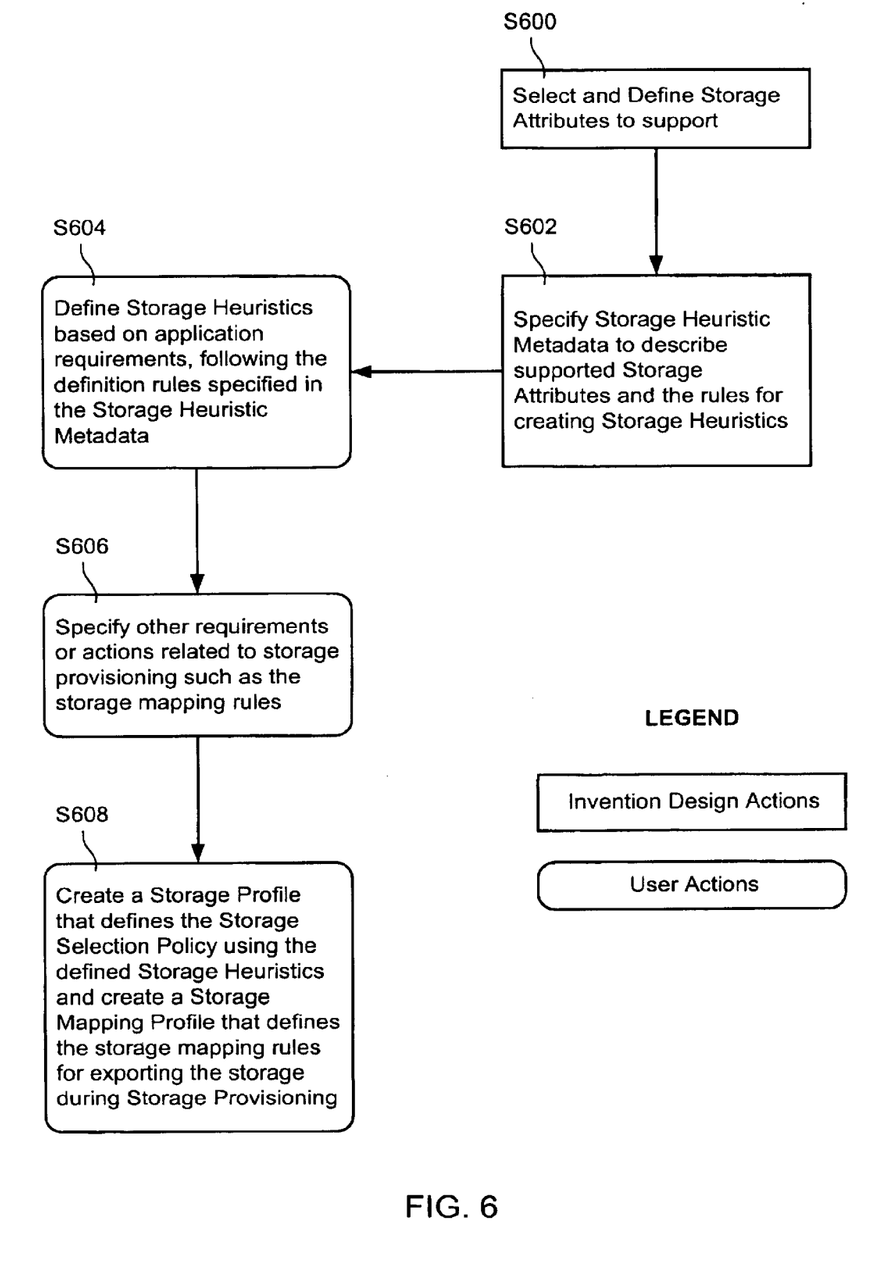
FIG. 6 illustrates a method for creating a storage provisioning policy according to one embodiment.

FIG. 6 illustrates a method for creating a storage provisioning policy according to one embodiment. As mentioned above, the storage provisioning policy is specified by a storage profile and may be defined based upon QoSS requirements and/or application requirements.

In step S600, storage attributes that are supported by VSX 100 are selected and defined. These attributes are the supported attributes that define what characteristics will be used to provision storage.

In step S602, storage heuristic metadata is defined. The storage heuristic metadata describe the supported storage attributes and are used to specify the rules for creating storage heuristics.

In step S604, storage heuristics are specified for the storage attributes using the domain and units of the storage heuristic metadata. The heuristics may be based on application requirements or QoSS standards.

Once the storage heuristics are defined, other requirements or actions may be defined (step S606). For example, as described above, corrective actions, storage mapping rules, or additional policies may be specified.

In step S608, a storage profile and a storage mapping profile are created that define the storage provisioning policy. The storage profile is created using the defined storage heuristics and other requirements and actions. The storage mapping profile is created by specifying the mapping rules for the storage. The storage profile and storage mapping profile may be stored in VSX 100 or be stored remotely but be accessible by VSX 100.

In one embodiment, an administrator creates a storage provisioning policy. In another embodiment, applications or software agents acting on behalf of the application create the storage provisioning policies. Policies may also be created dynamically from a policy that is being enforced. In this case, changes in characteristics of the storage, application, or profile may cause policies to be dynamically created. For example, storage heuristic metadata may have a range of 1–100,000 MB/second. An action may be created indicating that if discovered data is greater than 100,000 MB/second, an action should be taken by VSX 100 to create a new policy using new storage heuristics for the new data. Additionally, storage heuristic metadata for the storage attribute may be changed because of the new discovered data.

Figure 7:
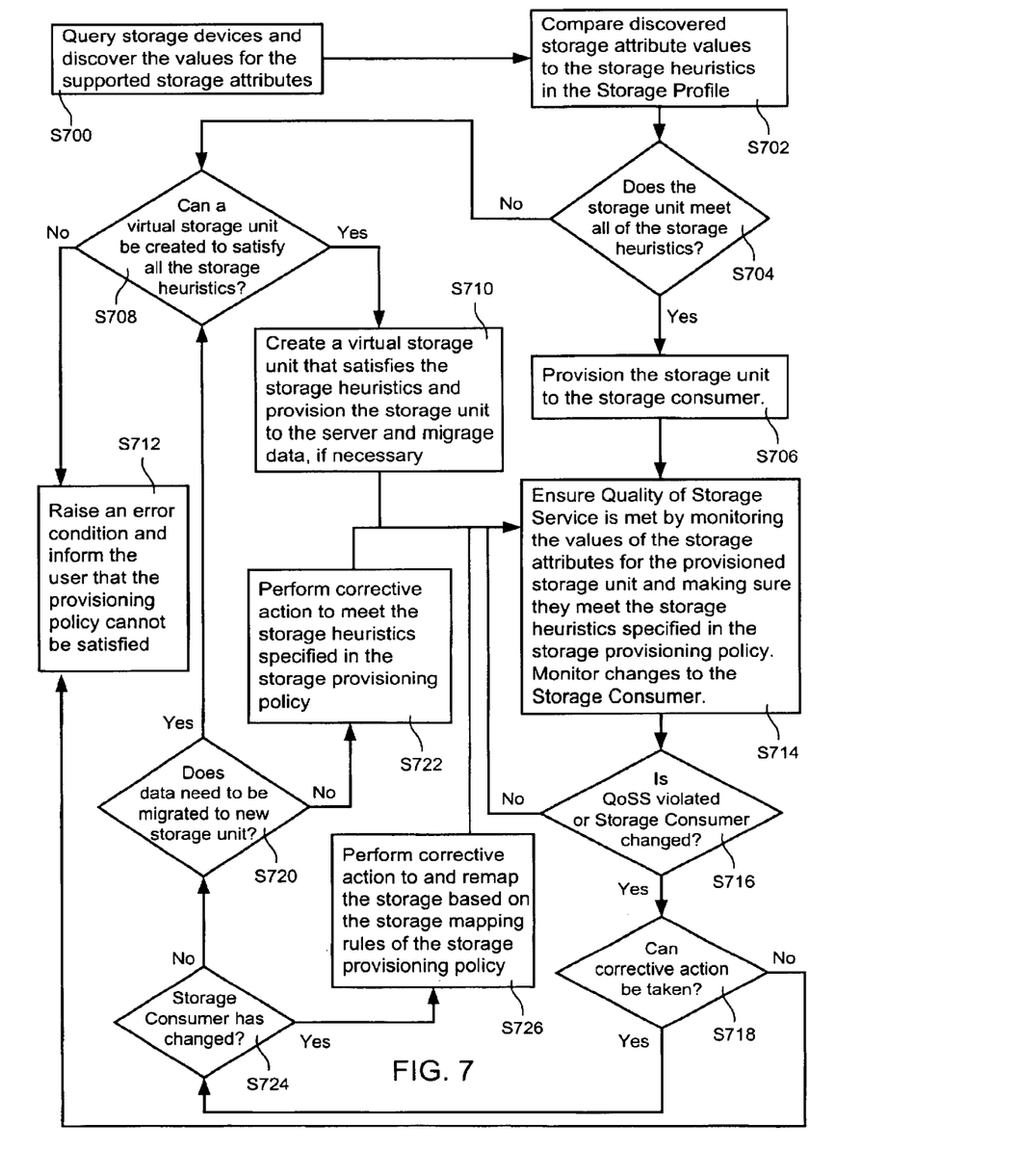
FIG. 7 illustrates a method for provisioning storage using a storage provisioning policy according to one embodiment.

FIG. 7 illustrates a method for provisioning storage using a storage provisioning policy according to one embodiment. VSX 100 uses the policies to select storage for provisioning, where software of VSX 100 uses the rules and constraints defined in a storage profile to query for storage devices that satisfy the rules. As mentioned above, the provisioning of storage may include provisioning storage units from storage devices, provisioning storage devices, or provisioning any other storage. The provisioning will, however, be referred to as provisioning storage devices but will be understood to mean any provisionable storage.

In step S700, VSX 100 queries for and receives discovered storage attribute data for supported storage attributes. Additionally, the VSX may receive all discovered storage attribute data and filter the data for only the supported attributes in the profile.

In step S702, the discovered storage attribute data from the storage devices are compared to the storage heuristics in a storage profile. In step S704, VSX 100 determines if any storage devices satisfy the constraints or rules of the storage heuristics.

If a storage device does include data that satisfy the storage heuristics, VSX 100 may automatically provision the storage device to a host computer 106 (step S706). In one embodiment, the provisioning is done using storage mapping rules. Additionally, if more than one storage device satisfies the heuristics, VSX 100 may provision all the devices or a policy in the storage profile may specify how many storage devices are provisioned.

If no storage device includes data that satisfy the storage heuristics, in step S708, VSX 100 determines if a virtual storage unit may be created to satisfy the storage heuristics of the storage profile. If not, an error condition is created and the user is informed that the provisioning policy cannot be satisfied (S712). If a virtual storage unit is capable of being created, VSX 100 creates one or more virtual storage units (virtual Media Units) that satisfy the storage heuristics and the virtual storage unit is provisioned to the server (S710). A virtual Media Unit is a unit of storage that is constructed from the physical storage (disks) available in the network. A virtual Media Unit has the same behavior as physical units of storage and may be used by host computer 106 but has characteristics that are usually different from that the underlying physical units of storage used to create the virtual Media Unit. Examples of virtual Media Units include but are not restricted to concatenations, mirror sets, and RAID of different types. In another embodiment, VSX 100 may also try to change the characteristics of the physical storage devices to meet the constraints, if necessary and possible, by, for example, setting mode sense pages if it allows the disk to meet the specified constraints.

In step S714, VSX 100 monitors the discovered storage attribute data for the provisioned storage unit and determines if the data meet the storage heuristics specified in the storage provisioning policy. In step S714 changes to the characteristics of the storage consumers are also monitored.

In step S716, VSX 100 determines if the heuristics are being satisfied and that there are no changes to the characteristics of the storage consumer. The monitoring ensures that QoSS is being met and that the characteristics of the storage consumer have not changed.

If the heuristics are being met and there are no changes to the characteristics of the storage consumer, the process reiterates back to step S714 to continue monitoring discovered storage attribute data.

If the heuristics are not being met or there are changes to the characteristics of the storage consumer, in step S718, VSX 100 determines if corrective action may be taken.

If corrective actions are needed, in step S724, it is determined whether the corrective actions are with respect to changes in the characteristics of the storage consumer or with respect to the QoSS requirements.

If corrective actions are needed with respect to the QOSS requirements not being met, in step S720, it is determined if data needs to be migrated to a new storage device. If so, the process proceeds to step S708, where it is determined if a virtual storage unit may be created.

If data does not need to be migrated, in step S722, VSX 100 performs the corrective actions to meet the storage heuristics specified in the storage provisioning policy.

If corrective actions are needed with respect to changes in the characteristics of the storage consumer, in step S726, the VSX 100 performs the corrective actions to accommodate changes to the characteristics of the storage consumer using the rules specified in the storage mapping profile of storage provisioning policy.

Embodiments of the present invention provide an apparatus and method to create storage provisioning policies. The creation of the policies is facilitated using storage attributes, storage heuristics, and storage metadata. Using supported attributes and storage heuristic metadata, storage heuristics are specified for a storage profile. Storage meeting the constraints of the heuristics is then provisioned. Thus, policies may be created using QoSS or applications requirements and storage is automatically provisioned using the storage profile.

The above description is illustrative but not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

What is claimed is:

1. A method for provisioning one or more storage devices using one or more storage provisioning policies and discovered storage attribute data from the one or more storage devices, the one or more storage provisioning policies comprising one or more storage heuristics for one or more storage attributes, the method comprising:

comparing the discovered storage attribute data associated with the one or more storage devices to the one or more storage heuristics for the one or more storage attributes in the one or more storage provisioning policies; and if the discovered storage attribute data associated with a storage device in the one or more storage devices satisfy the one or more storage heuristics for the one or more storage attributes, provisioning the storage device.

2. The method of claim 1, further comprising if no discovered storage attribute data from the one or more storage devices satisfy the one or more storage heuristics for the one or more storage attributes, creating a virtual storage device, the virtual storage device configured to satisfy the one or more storage heuristics.

3. The method of claim 1, further comprising if no discovered storage attribute data from the one or more storage devices satisfy the one or more storage heuristics for the one or more storage attributes, configuring a storage device to satisfy the one or more storage heuristics.

4. The method of claim 1, wherein provisioning the storage device comprises using storage mapping rules to provision the storage device, wherein the storage mapping rules are specified in the one or more storage provisioning policy.

5. The method of claim 1, further comprising dynamically adapting the one or more storage provisioning policies.

6. The method of claim 1, further comprising creating new storage provisioning policies.

7. The method of claim 1, further comprising monitoring the one or more storage heuristics.

8. The method of claim 7, further comprising taking a corrective action if one or more of the storage heuristics are violated.

9. The method of claim 7, further comprising creating a virtual storage device if one or more of the storage heuristics are violated, the virtual storage device configured to satisfy the one or more storage heuristics.

10. The method of claim 7, further comprising:
taking a corrective action if the characteristics of a storage consumer changes.

11. A method for creating one or more storage provisioning policies, the method comprising:
defining one or more storage attributes;
defining one or more storage heuristic metadata associated with the one or more storage attributes; and
specifying one or more storage heuristics using the defined one or more storage heuristic metadata associated with the one or more defined storage attributes to create a storage provisioning policy in the one or more storage provisioning policies, the storage provisioning policy usable to provision a storage device, wherein the provisioned storage device includes discoverable data that satisfies the storage heuristics for the storage attributes.

12. The method of claim 11, further comprising defining one or more storage mapping rules; and
using the defined one or more storage mapping rules to create the storage provisioning policy.

13. The method of claim 11, further comprising dynamically adapting the storage provisioning policy.

14. The method of claim 13, wherein dynamically adapting the storage provisioning policy comprises discovering newly defined storage attributes and newly defined storage heuristics associated with the newly defined storage attributes.

15. The method of claim 11, further comprising defining requirements in the storage provisioning policy.

16. The method of claim 11, further comprising defining actions to be taken if one or more heuristics are violated for the storage provisioning policy.

17. The method of claim 16, wherein the action comprises taking a corrective action if one or more of the storage heuristics are violated.

18. The method of claim 16, wherein the action comprises creating a virtual storage device if one or more of the storage heuristics are violated, the virtual storage device configured to satisfy the one or more storage heuristics.

19. The method of claim 11, further comprising storing the specified storage heuristics in a storage profile.

20. A method for provisioning one or more storage devices using discovered storage attribute data from the one or more storage devices and supported storage attributes with associated one or more defined storage heuristic metadata, the method comprising:
creating a storage provisioning policy, wherein creating the storage provisioning policy comprises specifying storage heuristics using the one or more defined storage heuristic metadata associated with the one or more storage attributes;
comparing the discovered storage attribute data associated with the one or more storage devices to the one or more storage heuristics in the storage provisioning policy; and
if the discovered storage attribute data associated with a storage device in the one or more storage devices satisfy the one or more storage heuristics, provisioning the storage device.

21. The method of claim 20, further comprising if no discovered storage attribute data from the one or more storage devices satisfy the one or more storage heuristics, creating a virtual storage device, the virtual storage device configured to satisfy the one or more storage heuristics.

22. The method of claim 20, wherein creating the storage provisioning policy further comprises specifying storage mapping rules.

23. The method of claim 22, wherein provisioning the storage device comprises using the storage mapping rules to provision the storage device.

24. A storage management device for provisioning one or more storage devices using one or more storage provisioning policies and discovered storage attribute data from the one or more storage devices, the one or more storage provisioning policies comprising one or more storage heuristics for one or more storage attributes, the method comprising:
instructions for comparing the discovered storage attribute data associated with the one or more storage devices to the one or more storage heuristics for the one or more storage attributes in the one or more storage provisioning policies; and
instructions for provisioning the storage device if the discovered storage attribute data associated with a storage device in the one or more storage devices satisfy the one or more storage heuristics for the one or more storage attributes.

25. The storage management device of claim 24, further comprising instructions for if no discovered storage attribute data from the one or more storage devices satisfy the one or more storage heuristics for the one or more storage attributes, creating a virtual storage device, the virtual storage device configured to satisfy the one or more storage heuristics.

26. The storage management device of claim 24, further comprising instructions for if no discovered storage attribute data from the one or more storage devices satisfy the one or more storage heuristics for the one or more storage attributes, configuring a storage device to satisfy the one or more storage heuristics.

27. The method of claim 24, wherein instructions for provisioning the storage device comprise instructions for using storage mapping rules to provision the storage device, wherein the storage mapping rules are specified in the one or more storage provisioning policies.

28. The storage management device of claim 24, further comprising instructions for dynamically adapting the one or more storage provisioning policies.

29. The storage management device of claim 24, further comprising instructions for creating new storage provisioning policies.

30. The storage management device of claim 24, further comprising instructions for monitoring the one or more storage heuristics.

31. The storage management device of claim 24, further comprising:
instructions for taking a corrective action if one or more of the storage heuristics are violated.

32. The storage management device of claim 31, further comprising:
instructions for creating a virtual storage device if one or more of the storage heuristics are violated, the virtual storage device configured to satisfy the one or more storage heuristics.

33. The method of claim 24, further comprising:
instructions for taking a corrective action if the characteristics of a storage consumer changes.

34. A storage management device for creating one or more storage provisioning policies, the method comprising:
one or more storage attributes;
one or more storage heuristic metadata associated with the one or more storage attributes; and
instructions for receiving a specification of one or more storage heuristics using the defined one or more storage heuristic metadata associated with the one or more defined storage attributes to create a storage provisioning policy in the one or more storage provisioning policies, the storage provisioning policy usable to provision a storage device, wherein the provisioned storage device includes discoverable data that satisfies the storage heuristics for the storage attributes.

35. The method of claim 34, further comprising defining one or more storage mapping rules; and
using the defined one or more storage mapping rules to create the storage provisioning policy.

36. The storage management device of claim 34, further comprising instructions for dynamically adapting the storage provisioning policy.

37. The storage management device of claim 36, wherein instructions for dynamically adapting the storage provisioning policy comprises instructions for discovering newly defined storage attributes and newly defined storage heuristics associated with the newly defined storage attributes.

38. The storage management device of claim 34, further comprising instructions for receiving definitions of requirements in the storage provisioning policy.

39. The method of claim 34, further comprising instructions for receiving definitions of actions to be taken if one or more heuristics are violated for the storage provisioning policy.

40. The storage management device of claim 34, further comprising instructions for storing the specified one or more storage heuristics in a storage profile.

41. A storage management device for provisioning one or more storage devices using discovered storage attribute data from the one or more storage devices and supported storage attributes with associated one or more defined storage heuristic metadata, the method comprising:
instructions for creating a storage provisioning policy, wherein creating the storage provisioning policy comprises specifying one or more storage heuristics using the one or more defined storage heuristic metadata associated with the one or more storage attributes;
instructions for comparing the discovered storage attribute data associated with the one or more storage devices to the one or more storage heuristics the storage provisioning policy; and
if the discovered storage attribute data associated with a storage device in the one or more storage devices satisfy the one or more storage heuristics, instructions for provisioning the storage device.

42. The method of claim 41, further comprising if no discovered storage attribute data from the one or more storage devices satisfy the one or more storage heuristics, creating a virtual storage device, the virtual storage device configured to satisfy the one or more storage heuristics.

43. The method of claim 41, wherein creating the storage provisioning policy further comprises specifying storage mapping rules.

44. The method of claim 43, wherein provisioning the storage device comprises using the storage mapping rules to provision the storage device.

* * * * *